June 16, 1931.  M. URBINATI  1,810,379
CURRENT TRANSFORMER
Filed June 20, 1928   2 Sheets-Sheet 1
Fig. 1.
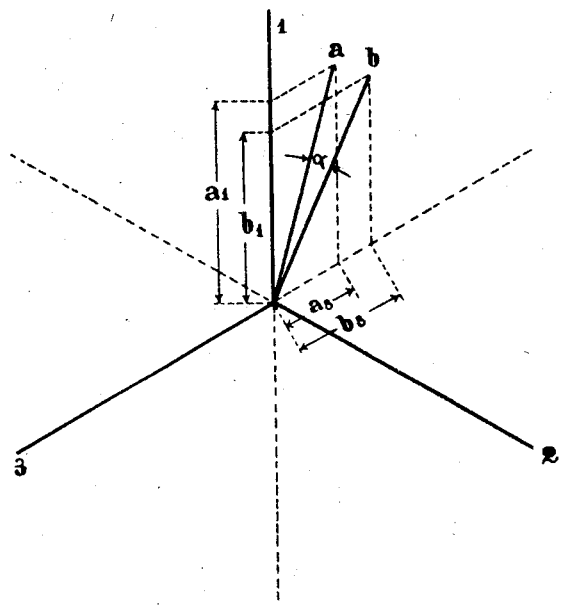
Fig. 2.  Fig. 3.  Fig. 4.
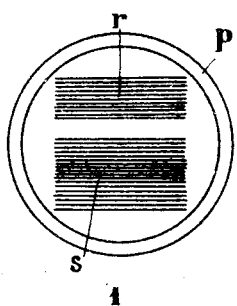 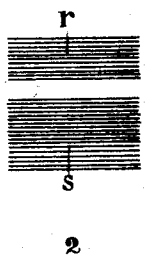 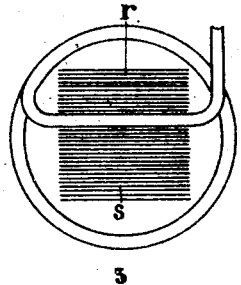
Inventor
Mario Urbinati
By
Atty.

Patented June 16, 1931

1,810,379

UNITED STATES PATENT OFFICE

MARIO URBINATI, OF ROME, ITALY

CURRENT TRANSFORMER

Application filed June 20, 1928, Serial No. 286,853, and in Italy June 23, 1927.

My invention refers to improvements in apparatus for the transformation of electric alternating currents into direct currents, and vice versa, of the kind comprising a transformer with a system of windings, connected with a fixed collector, through which circulate the alternating currents of different phase generated by the transformer, and a system of brushes revolving upon the said collector and connected to rings which revolve together with them. Said revolving rings slide under fixed brushes, to which are attached conductors through which circulates the continuous current produced by the transformer or, alternatively, the continuous current which it is desired to transform into alternating current.

Transformers of the kind above described comprising an arrangement similar to that applied to Pacinotti's ring in ordinary dynamos are well known; according to my present invention however, the relative motion of the collector is reverted.

It is therefore clear that if, instead of causing the ring and the collector to revolve, this system is maintained stationary and in the turns connected to the various bars are caused to circulate alternating currents of different phase, generated so as to obtain in each motionless turn the same variation and succession of current which would be obtained in case of the rotation of the ring in the fixed magnetic field, the commutation diameter, on the contrary, will revolve in the space and therefore in respect to the fixed collector with a speed equal and contrary to that which the ring would have had.

If, as it occurs in practice, the alternating currents circulating in the different turns or groups of turns connected with the collector are obtained statically that is, by means of fixed windings and by a combination of the electromotive forces induced from a system of polyphase currents, the rotation of the brushes with a speed equal to that of the commutation diameter is obtained by having them driven by a synchronous motor, fed by the alternating current to be transformed.

Usually, for feeding these apparatus a triphase current is at disposal. By the introduction of this current in a triphase three-column transformer, it is possible to obtain from the secondary winding of each column a phase and the diametrically opposed phase, that is together 6 phases. It is, therefore possible to construct with such a transformer a closed circuit similar to a six-phase Pacinotti's ring, and with 6 bars at the fixed collector, the displacement being of 360°/6 equal to 60 degrees between the successive phases.

By the provision, however, of appropriate connections between the secondary windings, it is possible to obtain from the same transformer, always fed by a triphase current, the equivalent of a ring with a greater number, $n$, of phases, in which the angle of displacement between each phase be $\alpha = 360°/n$. For this purpose it is sufficient to combine by means of stationary windings having a fixed position in space convenient fractions of the electromotive forces induced from two different columns, and this may be accomplished by conveniently connecting in series two groups of turns each of which is wound upon a different column. Thus, for example, as will be seen from the diagram of Fig. 1, phase $a$ will be obtained by composing the two electro-motive forces $a_1$ and $a_3$; phase $b$ adjacent to phase $a$ will similarly be obtained by composing the electromotive forces $b_1$ and $b_3$, and so on. It would therefore be possible, by proceeding in this manner, to increase at will the number of phases, if the components $a_1, b_1 \ldots a_3, b_3$ could be made to vary continuously.

In practice, however, there is a limit to the number of phases which is very soon reached, because, if the number of phases is great, the difference between the electromotive components $a_1, b_2$ and $a_3, b_3$ must be small. Now the difference between $a_1$ and $b_1$ depends on the difference of the number of turns which compose the respective windings, and it is evident that the smallest difference between these two numbers, which are necessarily entire numbers, is 1.

But in transformers of a medium or high power, the electromotive force of a turn is already so high that the angle α cannot go below a certain limit; this angle could be further reduced only if a very small section were assigned to the iron, in which case there would result transformers of disproportionate sizes, which are practically inadmissible.

This difficulty represents a serious obstacle to the use of said transformers of medium and high power, in cases in which it is required that angle α be very small. The object of the present invention is to do away with said difficulty by means of a new arrangement which permits the reduction at will of angle α, while maintaining normal the section of the iron.

As in the present case the turn is the irreducible unity, so, if the electromotive force induced by said turn is indicated by —e—, in the column it will be possible to have any multiple value of —e—, comprised between —e—, and —ne—, but no fractional values.

In order to have values variable for minor intervals, it suffices, according to the present invention, to substitute only one of the ordinary turns of the secondary winding embracing the whole iron by a group of turns, which may be called fractionary turns, comprising each of them only a fraction of the section of the iron. Thus, if it is desired to have not only all the differences from —e— to —ne— variable by multiples of —e—, but also the intermediate differences variable, for instance, by tenths of —e—, it would be sufficient to add four complementary turns wound only on fractions of the core so as to give respectively one 0,1 two 0,2 and one 0,5 of —e—. By combining these fractionary turns, through addition or subtraction, with the normal turns embracing the whole core, it is possible to obtain all the values from 0,1 to —ne—, variable by tenths.

In a similar manner would be proceeded as to any other desired division—, for instance, by twentieths or smaller fractions by operating as above described so as to obtain all values from 0.5 and multiples thereof, to —ne—, or from 0.033, and multiples thereof, to —ne—, etc.

In the annexed drawings illustrating schematically the principle underlying the invention and a practical embodiment of same:

Fig. 1 is a diagram showing the manner of combining the electromotive forces of a three phase current system;

Figures 2, 3 and 4 show various sections of a transformer provided with a laminated core, the secondary winding of which comprises whole turns and fractional turns.

Figure 5:
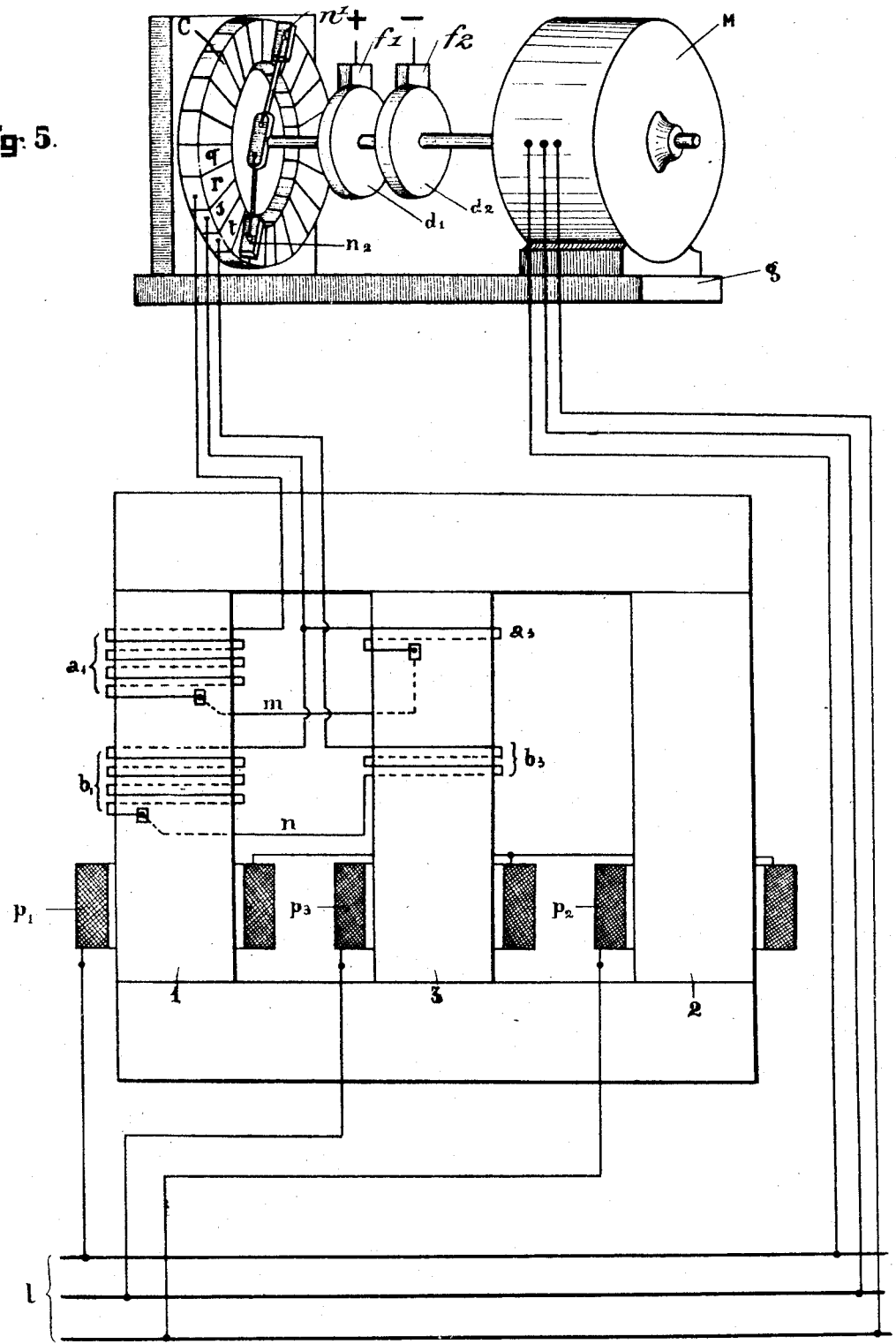
Figure 5 shows the complete combination embodied in this invention, that is a three-core transformer connected to a three-phase line and to the stationary commutator, the brush gear of which is driven by a synchronous motor connected also to the three-phase line.

In the example, schematically shown in Figs. 2, 3 and 4 of the accompanying drawings, it will be seen that the core of the transformer is divided into two or more parts $r$, $s$ . . . and that the primary winding $p$ is wound in each column upon the whole core of the iron, while some of the turns, which constitute the secondary winding, are wound upon the whole section of the iron of the corresponding column, and others surround only part of this iron.

Thus, the section of winding, which generates the electromotive power $a_3$, will be formed, for example, by 5 turns embracing the whole section of the iron of column 3, and the section of winding which gives rise to electromotive force $b_3$ will, on the contrary, be formed by 5 turns wound on the whole section and by a turn wound only upon part $r$.

In this manner, the difference between the electromotive forces $a_3$ and $b_3$ is no longer equal to the value of volt per turn of the transformer, but to the value of a fraction of the same, equal to the ratio between the section of part $r$ and the total section of the iron of a column.

A practical embodiment in the case of a three phase current is shown in Fig. 5, where it is assumed that the electromotive forces 1, 2, 3 of the diagram, Fig. 1, are those induced by the primary windings $p_1$, $p_2$, $p_3$, of the feeding current in the columns 1, 2, 3 of the transformer. Assumed further that the value of the volt per turn, that is per turn wound around the whole column, be equal to 1 volt and that the set of electromotive forces $a$, $b$, . . . is to be produced by combining electromotive forces, $a_1=3.7$ volts, $a_3=1.3$ volts, $b_1=3.2$ volts, $b_3=2.0$ volts, then the connections of the transformer will be made as follows: In order to obtain the E. M. F. $a_1$, there will be taken three whole turns around the column 1 and in addition a fourth fractionary turn surrounding only 7/10 of the entire section of the iron core; in the same manner, in order to obtain the E. M. F. $a_3$, a whole turn will be taken around the column 3 and in addition a second fractionary turn surrounding only 3/10 of the entire section of the iron core. Both said turns conveniently connected in series by means of the conductor $m$ will be connected to the adjoining bars $r$, $s$ of the stationary collector C. In the same manner one proceeds for the E. M. F. $b_1$, $b_3$ connected by means of the conductor $n$.

The rotating brushes $u$, $u_2$ and the rings $d_1$, $d_2$ revolving with them are mounted together on the shaft of the synchronous motor $m$ which is fed by the current of the same three phase line —$l$— to which the primaries of the transformer are connected. The motor —$m$— and the collector C are carried by a foundation plate —$g$— and the rings $d_1$, $d_2$ revolve under the fixed brushes $f_1$, $f_2$ connected to the line which carries away the direct current.

It is clear, moreover, that the above described arrangement, principally in view of its application to transformers of alternating currents into direct currents and vice versa, is also generally applicable in all such cases in which, in a simple monophase transformer it is desired to obtain from the secondary winding an induced current, the electromotive force of which has a ratio of transformation gradually variable by small intervals with the electromotive force of the feeding current.

I claim:

1. Apparatus for the transformation of electric alternating current into direct current and vice-versa, comprising a transformer inclusive of an iron core, a primary winding wound thereabout, a secondary winding wound thereabout, said secondary winding comprising a plurality of groups of turns, at least one turn of each group being of fractional length, the number of said groups and the values of the fractional turns thereof and of the iron surrounded by said fractional turns being such that the sum of the induced electromotive forces corresponding to the total of the fractional turns of all of the groups is equivalent to the electromotive force corresponding to a single turn around the entire section of the core.

2. Apparatus for the transformation of electric alternating current into direct current and vice-versa, comprising a transformer inclusive of an iron core, a primary winding wound thereabout, a secondary winding wound thereabout, said secondary winding comprising a plurality of groups of turns, at least one turn of each group being of fractional length and extending through the core, the number of said groups and the values of the fractional turns thereof and of the iron surrounded by said fractional turns being such that the sum of the induced electromotive forces corresponding to the total of the fractional turns of all of the groups is equivalent to the electromotive force corresponding to a single turn around the entire section of the core.

3. In apparatus for the transformation of polyphase current into direct current, a polyphase line, a transformer having a plurality of core portions one for each phase of the line, primary windings wound on said core portions and connected with the different phase portions of the line, respectively, secondary windings wound on said core portions, respectively, each of said secondary windings comprising a plurality of groups of turns, each group comprising a first portion having turns surrounding the entire related core portion and a second portion extending around only a fractional part of the related core portion, and connections between the first portions of the windings of the groups of turns on each core portion and the second portions of the groups of turns of a different core portion.

4. In apparatus for the transformation of polyphase current into direct current and vice-versa, a polyphase line, a plurality of transformers one for each phase of the line, each transformer having a core and a primary winding wound thereon, said primary windings being connected with the different phase portions of the line, respectively, a secondary winding wound on the core of each transformer, each secondary winding comprising a plurality of groups of turns, each group comprising a first portion having turns surrounding its related core and a second portion extending around only a fractional part of the related core, connections between the first portions of the windings of the groups of turns of each transformer and the second portions of the groups of turns of a different transformer, a stationary commutator, a cooperating rotatable brush gear, a synchronous motor connected with the same polyphase line supplying current to the primary windings of the transformers and also connected with said brush gear for rotating the same, and connections between said commutator and the different groups of the secondary windings of the respective transformers.

In testimony whereof I have affixed my signature at Rome, Italy, this fourth day of June, 1928.

MARIO URBINATI.